United States Patent [19]

Cather, Jr.

[11] 4,274,641
[45] Jun. 23, 1981

[54] SHAFT SEAL AND METHOD

[75] Inventor: Douglas A. Cather, Jr., Gastonia, N.C.

[73] Assignee: Garlock Inc., Longview, Tex.

[21] Appl. No.: 89,281

[22] Filed: Oct. 29, 1979

[51] Int. Cl.³ .............................................. F16J 15/32
[52] U.S. Cl. .................................... 277/153; 277/165; 277/1; 308/36.1
[58] Field of Search ...................... 277/152, 153, 165; 308/36.1, 187.1, 187.2

[56] References Cited

U.S. PATENT DOCUMENTS

| | | | |
|---|---|---|---|
| 3,099,454 | 7/1963 | Walinski | 277/153 X |
| 3,362,719 | 1/1968 | McCormick | 277/153 X |
| 3,438,639 | 4/1969 | Paulsen | 308/187.1 X |
| 3,455,564 | 7/1969 | Dega | 277/134 |
| 3,467,395 | 9/1969 | Kan | 277/153 X |
| 3,495,843 | 2/1970 | Andersen et al. | 277/153 X |
| 4,053,166 | 10/1977 | Domkowski | 277/152 |
| 4,093,244 | 6/1978 | Boutant | 277/153 |

FOREIGN PATENT DOCUMENTS

| | | | |
|---|---|---|---|
| 711737 | 10/1941 | Fed. Rep. of Germany | 277/153 |
| 2736207 | 2/1979 | Fed. Rep. of Germany | 277/153 |
| 1258972 | 3/1961 | France | 277/152 |
| 587881 | 1/1959 | Italy | 277/153 |
| 764231 | 12/1956 | United Kingdom | 308/36.1 |
| 919370 | 2/1963 | United Kingdom | 308/36.1 |

Primary Examiner—Robert S. Ward, Jr.
Attorney, Agent, or Firm—Schovee & Boston

[57] ABSTRACT

A shaft seal 10 and method for sealing fluids in applications with excessive shaft-to-bore misalignment or dynamic shaft runout, including a seal 10 having a mounting section 22, a sealing element 24, and a convoluted flex section 26 which allows radial movement of the sealing element. The sealing element 24 includes a bearing member 42 having a liner 46 with a low friction, cylindrical bearing surface adjacent the lip 38, for causing the lip 38 to follow any radial movement of the shaft, and to prevent the lip 38 from taking an oval shape and leaking.

37 Claims, 1 Drawing Figure

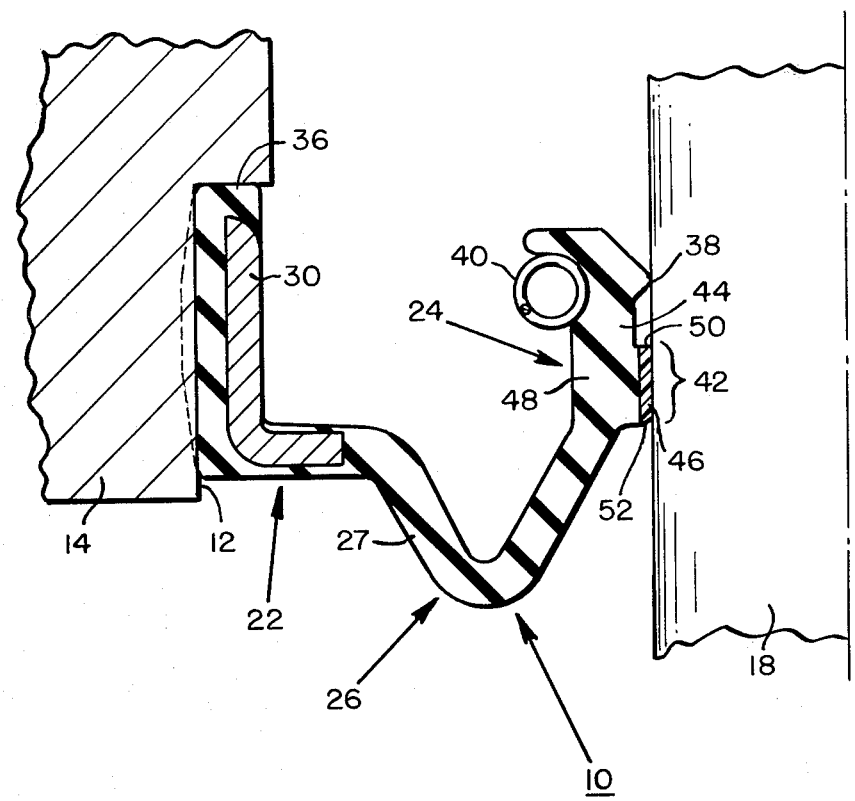

SHAFT SEAL AND METHOD

TECHNICAL FIELD

This invention relates to a shaft seal and method and in particular to sealing fluids in applications with excessive shaft-to-bore misalignment or dynamic shaft runout.

BACKGROUND OF THE PRIOR ART

Conventional shaft seals are unable to seal fluids in applications with excessive shaft-to-bore misalignment or dynamic shaft runout, due to the inability of the circular lip to follow the shaft surface. When the shaft axis is displaced radially relative to the axis of the bore, the sealing lip is compressed in the direction of shaft displacement, while the sealing lip on the opposite side often loses contact with the shaft.

Various attempts have been made in the prior art to solve this problem, such as by providing a shaft seal with a more flexible flex section, by varying garter spring load and/or lip interference, and by molding an annular rubber bead below the lip. These attempts to solve the problem have helped, however, they have not prevented the tendency for the lip to take an oval shape and leak.

BRIEF SUMMARY OF THE INVENTION

The shaft seal and method of this invention solve the above-mentioned problem by (1) providing a seal with a convoluted flex section which allows the lip to move radially with respect to the mounting portion of the seal, and (2) providing the seal with a bearing member having a cylindrical, low friction bearing surface adjacent the lip, which (a) forces the lip to move radially with the shaft, (b) provides a stiffening action to the lip to eliminate the tendency of the lip to take an oval shape, and (c) is molded at shaft size and because of the low friction surface tends not to lose shaft contact due to wear.

BRIEF DESCRIPTION OF THE DRAWING

The present invention will be more fully understood by reference to the following detailed description thereof, when read in conjunction with the attached drawing, wherein:

The FIGURE is a partial cross-sectional view through a seal according to the preferred embodiment of the present invention.

DETAILED DESCRIPTION OF THE INVENTION

Referring now to the drawing, the FIGURE shows a seal 10 mounted in a bore 12 of a housing 14 and sealing against a shaft 18 to prevent the loss of fluid through the annular space between the bore and the shaft.

The seal 10 comprises an annular bore retention section 22, an annular sealing element 24 and an annular preferably convoluted, flex section 26 connecting the bore retention section to the sealing element. In the preferred embodiment, the two sections 22 and 26 and the sealing element 24 are integral parts of a unitary, molded elastomeric body 27.

The bore retention section 22 includes a metal reinforcing shell 30 having a cylindrical portion and a radial flange. A layer 36 of elastomer is located on the O.D. of the bore retention section 22 and has an O.D. of a size such as to provide a press-fit of the seal 10 in the bore 12. The as-molded, domed shaped of the O.D. layer 36 is shown in dotted lines (somewhat exaggerated) in the FIGURE. Other shapes and types of mounting portions can be used in the seal 10 in place of the specific section 22 shown in the FIGURE.

The convoluted flex section 26 is V-shaped with the apex of the V pointing axially outwardly (the axial outward direction in the FIGURE is downward, as will be understood by any one skilled in this art, with lubricating fluid located axially inwardly of the seal 10 and with the seal preventing the lubricating fluid from flowing in the downward direction in the FIGURE). The two legs of the V are of about the same length and thickness and the included angle is approximately 60°. Other types of flex sections can be used. This flex section 26 enables the sealing element 24 to move radially with respect to the bore retention section 22.

The sealing element 24 includes a sealing lip 38, a bearing member 42, and an intermediate flex portion 44. The lip 38 can be backed up by a garter spring 40, as is known in this art, although such is not essential to all embodiments of this invention. The bearing member 42 includes, in the preferred embodiment, a liner 46 of polytetrafluoroethylene bonded to an elastomeric backing section 48. Other low friction materials can be used for the liner 46. The bearing member 42 is preferably spaced-apart from the sealing lip 38 by the intermediate flex portion 44 so as not to affect the compressive load on the lip generated by the garter spring 40, and so as not to restrict normal flexing of the lip. However, the intermediate flex section 44 is not essential to operation of all embodiments of this invention.

The I.D. of the liner 46 is preferably molded at shaft size, and because of its low friction characteristics, tends not to lose shaft contact due to wear. The bearing member 42 acts as a bearing with respect to the shaft forcing the lip 38 to move radially with the shaft. The bearing member provides a stiffening action to the sealing element 24 which eliminates the tendency for the lip 38 to take an oval shape. The polytetrafluoroethylene liner closely surrounds the shaft adjacent the lip forcing the lip to follow any radial movement of the shaft and preventing the lip from taking an oval shape. That is, the liner eliminates the tendency of the compressive force on the lip to increase on one side and to decrease on the opposite side enough to allow leakage. The liner 46 makes contact with the shaft 18 over an axial length sufficient to prevent cocking of the sealing element 24 during radial displacement. Thus, instead of the shaft pushing against, and displacing the lip, the shaft must push against the bearing member 42. The bearing member 42 thus helps to keep the lip contact point on the shaft and prevents the shaft from causing the lip to fold up and/or bell-mouth.

In a preferred embodiment and application of the present invention, the seal 10 is used to seal the pivot shaft between the cab and tractor portions of a crane or derrick. There is oscillating or reciprocating motion (in contrast to high r.p.m. rotational motion) in this application and the seal 10 must seal a head of lubricant above the seal. Shaft speed and dynamic shaft runout are low. However, there is usually excessive shaft-to-bore misalignment in this application, such as the shaft axis being displaced or misaligned from about 0.030 to 0.125 inch from the bore axis. A conventional seal could not even take the 0.030 inch original flex displacement or misalignment, let alone the 0.125 inch misalignment.

In this preferred embodiment, the seal 10 has the following dimensions:
Seal O.D.: 5.140 inch
Liner I.D.: 3.875–3.880 inch
Length of liner: 0.100 inch
Thickness of liner: 0.015 inch
Length of intermediate flex section: 0.010–0.020 inch
Thickness of legs of V-shaped flex section: 0.060 inch
Height of seal mounting portion: 0.375 inch
Thickness of elastomeric section 48: 0.095 inch
Shaft diameter: 3.875
Included angle of V-shaped flex section: 60°

In the preferred embodiment, the seal 10 is made by compression molding with the seal upside-down from its position shown in the FIGURE. A metal shell and a polytetrafluoroethylene ring are placed in the mold with a blank prep form of elastomer above the ring, and the mold is closed. The flowing elastomer forms the polytetrafluoroethylene; a shoulder or step in the mold forms a shoulder 50 in the seal and properly locates the liner 46. It is not necessary to operation of the seal 10 to have this shoulder 50, although the shoulder dimension can be used to provide the intermediate flex portion 44 with the desired amount of flexibility. After molding, the liner 46 is trimmed off at it's end 52.

The stiffness of the bearing member 42 is primarily provided by the elastomeric material in the elastomeric section 48 rather than by the liner 46. The intermediate flex portion 44 is not essential to the operation of all embodiments of this invention. While the liner 46 is preferably axially outwardly of the lip 38, where it also acts as a dirt excluder in such location, the liner could alternatively be located axially inwardly of the lip 38 or alternatively in both locations. The seal preferably is installed as a press-fit in the bore 12 although other methods can be used, as desired.

The invention has been described in detail with particular reference to the preferred embodiment thereof, but it will be understood that variations and modifications can be effected within the spirit and scope of the invention as described hereinafter and as defined in the appended claims. For example, the present invention can also be used in other applications, such as ones in which there is high-speed relative rotation between the shaft and housing and/or where there are high amounts of dynamic shaft runout. As stated above, other types and shapes of seal mounting sections and flex sections can be used. The term "low friction bearing surface" means a surface having a lower coefficient of friction than does the elastomeric body 27 itself.

I claim:

1. An annular shaft seal for sealing against the flow of fluid through an annular space between a bore of a housing and a shaft extending through the bore, comprising:
   (a) an annular bore retention section;
   (b) an annular sealing element;
   (c) an annular convoluted flex section connecting said bore retention section to said sealing element and adapted to allow said sealing element to move freely radially with a shaft and relative to said bore retention section; and
   (d) said sealing element including: (1) a sealing lip adapted to sealingly contact a shaft extending through said seal and also including (2) a bearing member having a cylindrical low friction bearing surface adjacent said sealing lip adapted to contact a shaft in sealing contact with said sealing lip.

2. The shaft seal as recited in claim 1 wherein said bore retention section, said flex section and said sealing element comprise a unitary, molded elastomeric body.

3. The shaft seal as recited in claim 2 wherein said bearing member includes a liner of low friction material bonded to an elastomeric section of said bearing member, said liner having said low friction surface.

4. The shaft seal as recited in claim 3 wherein said liner is made of polytetrafluoroethylene.

5. The shaft seal as recited in claim 4 wherein said bore retention section further comprises a metal support shell.

6. The shaft seal as recited in claim 5 further comprising a garter spring on said sealing element urging said lip radially inwardly.

7. The shaft seal as recited in claim 6 wherein said shell includes a cylindrical portion and a radial flange.

8. The shaft seal as recited in claim 7 wherein said liner is located axially outwardly from said sealing lip.

9. The shaft seal as recited in claim 4 wherein said bearing member has axial length and stiffness sufficient to prevent cocking of said sealing element during radial displacement of said sealing element.

10. The shaft seal as recited in claim 9 wherein said liner has an axial length of about 0.100 inch.

11. The shaft seal as recited in claim 10 wherein said liner is located axially outwardly from said sealing lip.

12. The shaft seal as recited in claim 11 wherein said liner is spaced-apart from said sealing lip by an intermediate flex portion located between said sealing lip and said bearing member and having sufficient length to allow the sealing lip to move radially with respect to said bearing member.

13. The shaft seal as recited in claim 12 wherein said liner has a thickness of about 0.015 inch and said elastomeric section of said bearing member has a thickness of about 0.095 inch.

14. The shaft seal as recited in claim 4 wherein said liner is spaced-apart from said sealing lip by an intermediate flex portion located between said sealing lip and said bearing member and having sufficient length to allow the sealing lip to move radially with respect to said bearing member.

15. The shaft seal as recited in claim 14 wherein said liner is located axially outwardly from said sealing lip.

16. The shaft seal as recited in claim 15 wherein said intermediate flex portion has a length in the range of from about 0.010 to 0.020 inch.

17. The shaft seal as recited in claim 4 wherein said bearing member has sufficient strength to maintain said lip circular.

18. The shaft seal as recited in claim 17 wherein said liner has a thickness of about 0.015 inch and said elastomeric section of said bearing member has a thickness of about 0.095 inch.

19. The shaft seal as recited in claim 18 wherein said liner is located axially outwardly from said sealing lip.

20. The shaft seal as recited in claim 4 wherein said convoluted flex section is V-shaped in cross-section with the apex of the V pointed axially outwardly.

21. The shaft seal as recited in claim 20 wherein said convoluted flex section has two legs of approximately equal length and thickness.

22. The shaft seal as recited in claim 21 wherein the included angle of said V is about 60°.

23. The shaft seal as recited in claim 4 wherein said sealing lip has an as-molded I.D. smaller than that of said liner.

24. The shaft seal as recited in claim 23 wherein said liner is located axially outwardly from said sealing lip.

25. The shaft seal as recited in claim 1 wherein said bearing member includes a polytetrafluoroethylene liner having said low friction surface.

26. The shaft seal as recited in claim 25 wherein said liner is located axially outwardly from said sealing lip.

27. The shaft seal as recited in claim 25 wherein said liner is spaced-apart from said sealing lip by an intermediate flex portion located between said sealing lip and said bearing member and having sufficient length to allow the sealing lip to move radially with respect to said bearing member.

28. The shaft seal as recited in claim 25 wherein said sealing lip has an as-molded I.D. smaller than that of said liner.

29. The shaft seal as recited in claim 28 wherein said liner is located axially outwardly from said sealing lip.

30. The shaft seal as recited in claim 29 wherein said liner is spaced-apart from said sealing lip by an intermediate flex portion located between said sealing lip and said bearing member and having sufficient length to allow the sealing lip to move radially with respect to said bearing member.

31. The shaft seal as recited in claim 1 including in combination therewith a housing having a bore therethrough, a shaft extending through said bore, said seal being mounted in said bore with said sealing lip being in sealing contact with said shaft and with said low-friction bearing surface having an as-molded I.D. substantially identical to the O.D. of said shaft.

32. A method for sealing against the flow of fluid through an annular space between a bore of a housing and a shaft extending through the bore, wherein excessive shaft-to-bore misalignment and/or dynamic shaft runout exists, comprising the steps of:
   (a) mounting in said bore a shaft seal including an annular bore retention section, an annular sealing element, and an annular convoluted flex section connecting the bore retention section to the sealing element, said sealing element including a sealing lip and positioning said sealing lip in sealing contact with said shaft; and
   (b) preventing said sealing lip from taking an oval shape which would result in leakage of fluid through said seal, by positioning in said sealing element, adjacent said lip, a bearing member having a cylindrical, axially extending, low-friction bearing surface in contact with said shaft for providing a bearing with respect to said shaft for forcing said sealing lip to move radially with said shaft and for providing a stiffening action to said sealing element to eliminate the tendency for said lip to take an oval shape.

33. The method as recited in claim 32 including forming said low-friction bearing surface with an I.D. substantially identical to the O.D. of said shaft, whereby said bearing surface tends not to lose shaft contact because of wear.

34. The method as recited in claim 32 including providing said bearing member with sufficient axial and radial dimensions to prevent cocking of said sealing element during radial displacement thereof.

35. The method as recited in claim 32 including the step of forming said bearing member as a polytetrafluoroethylene liner bonded to an elastomeric backing section of said bearing member, said liner having said low friction surface.

36. The method as recited in claim 32 including positioning said bearing member axially outwardly from said sealing lip.

37. The method as recited in claim 32 including axially spacing said bearing member a short distance apart from said sealing lip to provide an intermediate flex section between said sealing lip and said bearing member such that said bearing member does not affect the compressive load generated by the seal on said sealing lip and allows flexing of said lip with respect to said bearing member.

* * * * *